US012350899B2

(12) United States Patent
Mukherjee et al.

(10) Patent No.: US 12,350,899 B2
(45) Date of Patent: Jul. 8, 2025

(54) WIND TURBINE BLADE TOOL AND METHOD FOR PRODUCING A WIND TURBINE BLADE

(71) Applicants: Blade Dynamics Limited, Eastleigh (GB); LM Wind Power A/S, Kolding (DK)

(72) Inventors: Manish Mukherjee, Eastleigh (GB); Michael Lund-Laverick, Kolding (DK)

(73) Assignees: BLADE DYNAMICS LIMITED, Eastleigh (GB); LM WIND POWER A/S, Kolding (DK)

(*) Notice: Subject to any disclaimer, the term of this patent is extended or adjusted under 35 U.S.C. 154(b) by 515 days.

(21) Appl. No.: 17/616,415

(22) PCT Filed: Jun. 4, 2020

(86) PCT No.: PCT/EP2020/065471
§ 371 (c)(1),
(2) Date: Dec. 3, 2021

(87) PCT Pub. No.: WO2020/245263
PCT Pub. Date: Dec. 10, 2020

(65) Prior Publication Data
US 2022/0314568 A1    Oct. 6, 2022

(30) Foreign Application Priority Data
Jun. 4, 2019 (GB) .................................. 1907911

(51) Int. Cl.
*B29D 99/00* (2010.01)
*B29C 70/46* (2006.01)
*F03D 1/06* (2006.01)

(52) U.S. Cl.
CPC .......... *B29D 99/0028* (2013.01); *B29C 70/46* (2013.01); *F03D 1/0675* (2013.01); *F05B 2230/21* (2013.01)

(58) Field of Classification Search
CPC ... B29D 99/0028; F03D 1/0675; B29C 70/28; B29C 70/40; B29C 70/42; B29C 70/44;
(Continued)

(56) References Cited

U.S. PATENT DOCUMENTS 4,950,011 A * 8/1990 Borcea ............... H05K 13/0409
                                                        294/183
9,873,230 B1 * 1/2018 DesJardien ............. B29C 70/38
(Continued)

FOREIGN PATENT DOCUMENTS

CN    201900583 U    7/2011
EP    2468470 A1     6/2012
(Continued)

OTHER PUBLICATIONS

International Search Report issued on Aug. 18, 2020 for application No. PCT/EP2020/065471.

*Primary Examiner* — Andrew L Swanson
(74) *Attorney, Agent, or Firm* — Nath, Goldberg & Meyer; Jerald L. Meyer; Tanya E. Harkins

(57) ABSTRACT

Disclosed is a blade mould system for manufacturing of a wind turbine blade shell, the blade mould system comprising a blade mould having a moulding surface for defining an outer shape of a blade shell part, the blade shell part having an outer surface facing the moulding surface and an inner surface facing away from the moulding surface, and a first placement tool being positioned at a first placement tool position relative to the blade mould, the placement tool being adaptable between a first configuration and a second configuration. The first placement tool being configured to engage with a blade component being in a primary compo- (Continued)

nent position and position the blade component at a secondary component position relative to the moulding surface by the first placement tool attaining the second configuration, wherein the blade component is configured to be attached to the blade shell part in the secondary component position, wherein the first placement tool comprises a first movable part and a first stationary part.

18 Claims, 12 Drawing Sheets

(58) Field of Classification Search
CPC ..... B29C 70/443; B29C 70/48; B29C 70/446; B29C 70/46; B29C 70/461; B29C 70/462; B29C 70/465; B29C 70/467
See application file for complete search history.

(56) References Cited

U.S. PATENT DOCUMENTS

| | | | |
|---|---|---|---|
| 2005/0042323 A1* | 2/2005 | Habisreitinger | B29C 70/386 425/472 |
| 2011/0100542 A1 | 5/2011 | Faulkner et al. | |
| 2011/0260362 A1 | 10/2011 | Petersen | |
| 2012/0330453 A1* | 12/2012 | Samak Sangari | B25J 15/0616 700/121 |
| 2013/0239379 A1* | 9/2013 | Rajasingam | F03D 1/0675 29/889.7 |
| 2018/0250895 A1 | 9/2018 | Wardropper et al. | |
| 2018/0339469 A1* | 11/2018 | Stone | B29C 70/388 |
| 2022/0003203 A1* | 1/2022 | Bendel | B29C 66/532 |

FOREIGN PATENT DOCUMENTS

| | | |
|---|---|---|
| WO | 2009153344 A1 | 12/2009 |
| WO | 2012019610 A1 | 2/2012 |
| WO | 2012126479 A2 | 9/2012 |
| WO | 2013013676 A1 | 1/2013 |
| WO | 2013113817 A1 | 8/2013 |

* cited by examiner

WIND TURBINE BLADE TOOL AND METHOD FOR PRODUCING A WIND TURBINE BLADE

The present disclosure relates to wind turbine blades and manufacture of wind turbine blades. More specifically, the present disclosure pertains to the field of joining of parts of a wind turbine blade, such as joining of component, such as webs, glue flanges, etc.

This is a National Phase Application filed under 35 U.S.C. 371 as a national stage of PCT/EP2020/065471, filed Jun. 4, 2020, an application claiming the benefit of British Application No. 1907911.0, filed Jun. 4, 2019, the content of each of which is hereby incorporated by reference in its entirety.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two moulds. Afterwards, one of the two halves is turned upside down and positioned on top of the other of the two halves, and the two halves are adhered together. The blade parts may be positioned on top of each other by turning and repositioning the complete half mould.

A wind turbine blade and/or components of the wind turbine blade, such as webs and/or shells, may be manufactured by infusing fibres, such as glass fibre mats and/or carbon fibre mats with a resin, such as polyester or epoxy. Infusion of the fibres may be provided by vacuum assisted resin transfer moulding (VARTM).

As wind turbines and wind turbine blades increase in size, the blade loads, i.e. strains, bending moments, peel loads etc., in particular along the trailing edge, increase. For this and other reasons, precision in placement of component is of an increasing importance.

Furthermore, the design of the trailing edge is an important factor for the efficiency of the wind turbine. Wind turbine blades comprising a flatback profile at the trailing edge may have an increased efficiency. An optimized profile comprises a varying geometry of the trailing edge along the airfoil region of the blade. However, it may be complicated to assemble a wind turbine blade with a flatback trailing edge. In particular, it may be challenging to accurately position components to be bonded to the trailing edge part of the blade when the blade comprises a flatback profile.

SUMMARY OF THE INVENTION

It is an object of the present disclosure to provide a tool for the manufacture of a wind turbine blade and a method for manufacturing a wind turbine blade, which overcomes at least some of the disadvantages of the prior art.

In particular, it is an object of the present invention to provide a tool for the manufacture of a wind turbine blade and a method for manufacturing a wind turbine blade, which increases accuracy of positioning of components as well as facilitating decreased manufacturing time. Accurately positioning components may further decrease manufacturing variations and enhance mechanical properties of the assembled blade.

Thus, the present disclosure relates to a blade mould system for manufacturing of a wind turbine blade shell. The blade mould system comprises a blade mould having a moulding surface for defining an outer shape of a blade shell part. The blade shell part has an outer surface facing the moulding surface and an inner surface facing away from the moulding surface. The blade mould system comprises a first placement tool being positioned at a first placement tool position relative to the blade mould. The placement tool is adaptable between a first configuration and a second configuration.

The first placement tool is configured to engage with a blade component being in a primary component position. The first placement tool is configured to position the blade component at a secondary component position relative to the moulding surface by the first placement tool attaining the second configuration. The blade component is configured to be attached to the blade shell part, such as the inner surface of the blade shell part, in the secondary component position. The first placement tool comprises a first movable part and a first stationary part.

Also disclosed is a method for assembling a wind turbine blade with a blade mould system, such as the disclosed blade mould system, comprising a blade mould and a first placement tool. The blade mould has a moulding surface for defining an outer shape of a blade shell part. The blade shell part has an outer surface facing the moulding surface and an inner surface facing away from the moulding surface. The first placement tool is positioned at a first placement tool position relative to the blade mould. The placement tool is adaptable between a first configuration and a second configuration. The first placement tool comprises a first movable part and a first stationary part.

The method comprises engaging the first placement tool with a blade component being in a primary component position. The method comprises positioning the blade component at a secondary component position relative to the moulding surface by the first placement tool attaining the second configuration. The blade component is configured to be attached to the blade shell part, such as the inner surface of the blade shell part, in the secondary component position.

The present disclosure may facilitate more accurate placement of components of the wind turbine blade, such as adhesive flanges as well as other features influential to the blade design and manufacturing tolerances. Thereby, stronger wind turbine blades may be provided, production time may be reduced, and/or necessity of service and repair of the wind turbine blade may be reduced.

The blade component may be an internal component of the wind turbine blade, such as a web, a glue flange. The blade component may be different than a blade shell part. The blade component may be smaller than a blade shell part.

Although the present disclosure may provide examples related towards positioning of a component in the assembly of a wind turbine blade having a flatback trailing edge, for example, the blade component may be a glue flange for joining two half shells of a flat back wind turbine blade, it is emphasized that the principles as described herein may be applied alternatively or additionally to positioning of other components of a wind turbine blade.

The blade mould system may comprise one or more placement tools, e.g. the first placement tool and/or a second placement tool. The blade mould system may comprise a plurality of placement tools, e.g. including the first placement tool and the second placement tool. The plurality of placement tools may be distributed along the longitudinal direction of the blade mould. The plurality of placement tools may be distributed evenly along the longitudinal direction of the blade mould. The plurality of placement tools may be distributed in clusters on the blade mould.

The plurality of placement tools, such as the first placement tool and the second placement tool may comprise the same features.

The second placement tool may engage with the blade component being in the primary component position. The blade component may be positioned at a secondary component position relative to the moulding surface by the second placement tool attaining the second configuration.

The first placement tool and the second placement tool may engage the blade component in the primary component position simultaneously. The blade component may be positioned at the secondary component position relative to the moulding surface by the first placement tool attaining the second configuration and the second placement tool attaining the second configuration.

The inner surface of the blade shell part may comprise an attachment area comprising adhesive. The blade component may, e.g. in the secondary component position, contact the adhesive of the attachment area. The adhesive may be a fast curing adhesive, such as an adhesive with a curing time of less than 300 seconds, such as less than 180 seconds, such as less than 120 seconds, such as less than 60 seconds. The adhesive may be applied to the attachment area, e.g. before the blade component is positioned at a secondary component position.

Positioning the blade component in the secondary component position may comprise placing the blade component over the attachment area of the inner surface of the blade shell part.

The first placement tool and/or the second placement tool may be fixed to an outer part of the blade mould. The first placement tool and/or the second placement tool may be fixed at a predefined position of the blade mould, e.g. the first placement tool may be fixed at a first predefined position and/or the second placement tool may be fixed at a second predefined position. The first placement tool and/or the second placement tool may be fixed to the blade mould by being welded to the blade mould.

The first placement tool may comprise a first engaging surface. The first engaging surface may be configured to contact and releasably attach to a primary side surface part of the blade component. The second placement tool may comprise a second engaging surface. The second engaging surface may be configured to contact and releasably attach to a secondary side surface part of the blade component. The secondary side surface part may have a different shape than the primary side surface part. The second engaging surface of the second placement tool may have a different shape than the first engaging surface of the first placement tool. Alternatively, the secondary side surface part and the primary side surface part may have the same shape, and the second engaging surface and the first engaging surface may have the same shape.

Engaging the first placement tool with the blade component may comprise contacting and/or releasably attaching the first engaging surface of the first placement tool to the primary side surface part of the blade component. Engaging the second placement tool with the blade component may comprise contacting and/or releasably attaching the second engaging surface of the second placement tool to the secondary side surface part of the blade component.

The first engaging surface may comprise a first alignment tab configured to align the primary side surface part in a predefined position on the first engaging surface. The first alignment tab may protrude from the first engaging surface. The first alignment tab may protrude along a tab axis, e.g. on the entire length of the first engaging surface. The first alignment tab may protrude along a tab axis on a part of the length of the first engaging surface. The first alignment tab may ensure correct alignment of the blade component relative to the first placement tool, e.g. such that the blade component attaches to the predefined position, by providing a stop for an edge of the blade component. The first alignment tab may prevent movement of the blade component in a direction parallel and/or perpendicular to the longitudinal direction of the blade mould, and/or in a plane parallel to the longitudinal direction of the blade mould.

The second engaging surface may comprise a second alignment tab configured to align the secondary side surface part in a predefined position on the second engaging surface. The second alignment tab may protrude from the second engaging surface. The second alignment tab may protrude along a tab axis, e.g. on the entire length of the second engaging surface. The second alignment tab may protrude along the same tab axis as the first alignment tab of the first engaging surface. The second alignment tab may protrude along a tab axis on a part of the length of the second engaging surface. The second alignment tab may ensure correct alignment of the blade component relative to the second placement tool, e.g. such that the blade component attaches to the predefined position, by providing a stop for an edge of the blade component. The second alignment tab may prevent movement of the blade component in a direction parallel and/or perpendicular to the longitudinal direction of the blade mould, and/or in a plane parallel to the longitudinal direction of the blade mould.

The tab axis, such as the tab axis of the first alignment tab and/or of the second alignment tab, may be parallel to a longitudinal direction of the blade mould.

Engaging the first placement tool with the blade component may comprise aligning the primary side surface part in the predefined position on the first engaging surface. Engaging the second placement tool with the blade component may comprise aligning the secondary side surface part in the predefined position on the second engaging surface.

The first placement tool may comprise a first guiding part and the blade mould may comprise a mould guiding part. The first guiding part may be configured to engage with the mould guiding part when the first placement tool is in the second configuration. The first guiding part may have a female configuration. The mould guiding part may have a male configuration. Alternatively, the first guiding part may have a male configuration and the mould guiding part may have a female configuration. The first guiding part and the mould guiding part may prevent movement of the placement tool relative to the blade mould in certain directions. The first guiding part and the mould guiding part may prevent movement parallel and/or perpendicular to the longitudinal direction of the blade mould. The first guiding part and the mould guiding part may prevent movement in a plane parallel to the longitudinal direction of the blade mould.

The second placement tool may comprise a second guiding part. The second guiding part may be configured to engage with the mould guiding part when the second placement tool is in the second configuration. The second guiding part may be configured to engage with a second mould guiding part when the second placement tool is in the second configuration. The second guiding part may have a female configuration. The second mould guiding part may have a male configuration. Alternatively, the second guiding part may have a male configuration and the mould guiding part and/or the second mould guiding part may have a female configuration. The second guiding part and the mould guiding part and/or the second mould guiding part may prevent movement of the placement tool relative to the mould in certain directions. The second guiding part and the mould guiding part and/or the second mould guiding part may prevent movement parallel and/or perpendicular to the longitudinal direction of the blade mould. The second guiding part and the mould guiding part and/or the second mould guiding part may prevent movement in a plane parallel to the longitudinal direction of the blade mould.

The first placement tool attaining the second configuration may comprise engaging the first guiding part of the first placement tool with the mould guiding part of the blade mould. The second placement tool attaining the second configuration may comprise engaging the second guiding part of the second placement tool with the mould guiding part of the blade mould.

The blade mould system may comprise a component holder configured to retain the blade component in the primary component position. The first placement tool may be configured to engage with the blade component in the primary component position by attaining the first configuration wherein the first placement tool is able to retrieve the blade component from a component holder. The second placement tool may be configured to engage with the blade component in the primary component position by attaining the second configuration wherein the second placement tool is able to retrieve the blade component from a component holder. The component holder may be positioned at a component holder position relative to the blade mould. The component holder may be configured to hold a plurality of blade components. The component holder may be movable. Alternatively, the component holder may be fixed to the blade mould, such as the outer part of the blade mould, and/or fixed to the first placement tool and/or the second placement tool.

The first placement tool may attain the first configuration, e.g. prior to engaging the first placement tool with the blade component. Alternatively, engaging the first placement tool with a blade component may comprise the first placement tool attaining the first configuration.

The first placement tool may comprise a first movable part and a first stationary part. The first movable part may comprise the first engaging surface. The first movable part may comprise the first guiding part. The first stationary part may be positioned at the first placement tool position. The first stationary part may be fixed to the outer part of the blade mould. The second placement tool may comprise a second movable part and a second stationary part. The second movable part may comprise the second engaging surface. The second movable part may comprise the second guiding part. The second stationary part may be positioned at the second placement tool position. The second stationary part may be fixed to the outer part of the blade mould.

The first movable part may be in a first position relative to the first stationary part when the first placement tool is in the first configuration. The first movable part may be in a second position relative to the first stationary part when the first placement tool is in the second configuration. The second position may be different from the first position. The first movable part may be in a third position relative to the first stationary part between the first position and the second position, e.g. when the first placement tool is changing between the first configuration and the second configuration.

The second movable part may be in a first position relative to the second stationary part when the second placement tool is in the first configuration. The second movable part may be in a second position relative to the second stationary part when the second placement tool is in the second configuration. The second position may be different from the first position. The second movable part may be in a third position relative to the second stationary part between the first position and the second position, e.g. when the second placement tool is changing between the first configuration and the second configuration.

The first placement tool may comprise a hinge joint between the first movable part and the first stationary part. The first movable part may be rotatable, e.g. relative to the first stationary part, around a rotation axis. The second placement tool may comprise a hinge joint between the second movable part and the second stationary part. The second movable part may be rotatable, e.g. relative to the second stationary part, around a rotation axis, e.g. the same rotation axis as for the first placement tool. The rotation axis of the first placement tool and/or of the second placement tool may be parallel to a longitudinal direction of the blade mould.

Positioning the first placement tool in the first and/or second configuration comprises rotating the first movable part relative to the first stationary part around the rotation axis. Positioning the second placement tool in the first and/or second configuration comprises rotating the second movable part relative to the second stationary part around the rotation axis.

The first placement tool may comprise a first extending part configured to extend and retract the first movable part relative to the first stationary part along an extension axis, such as a first extension axis. The first extending part may be a telescopic element, scissor element or similar. The second placement tool may comprise a second extending part configured to extend and retract the second movable part relative to the second stationary part along an extension axis, such as a second extension axis. The first extension axis and the second extension axis may be substantially parallel. The second extending part may be a telescopic element, scissor element or similar. The extension axis, such as the first extension axis and/or the second extension axis, may be perpendicular to the rotation axis.

Engaging the first placement tool with the blade component may comprise extending the first movable part of the first placement tool. Extending the first movable part may enable the first placement tool to reach the blade component. Engaging the second placement tool with the blade component may comprise extending the second movable part of the second placement tool. Extending the second movable part may enable the second placement tool to reach the blade component.

Engaging the first placement tool with the blade component may comprise applying a negative pressure between the first engaging surface and the primary side surface part, e.g. applying vacuum. For example, attaching the first engaging surface of the first placement tool to the primary side surface part of the blade component may comprise applying a negative pressure between the first engaging surface and the primary side surface part, e.g. applying vacuum. Engaging the second placement tool with the blade component may comprise applying a negative pressure between the second engaging surface and the secondary side surface part, e.g. applying vacuum. For example, attaching the second engaging surface of the second placement tool to the secondary side surface part of the blade component may comprise applying a negative pressure between the second engaging surface and the primary side surface part, e.g. applying vacuum. Alternatively, attaching the first engaging surface of the first placement tool to the primary side surface part and/or attaching the second engaging surface of the second placement tool to the secondary side surface part may comprise activating a mechanical actuator. Alternatively, attaching the first engaging surface of the first placement tool to the primary side surface part and/or attaching the second engaging surface of the second placement tool to the secondary side surface part may comprise activating a magnetic attractor.

The blade component may be released from the first placement tool and/or second placement tool. Releasing the blade component may comprise deactivating attracting means, e.g. deactivating the negative pressure, or the mechanical actuator, or the magnetic attractor.

The method may comprise waiting until the blade component has been fixed to the attachment area before releasing the blade component from the first placement tool and/or second placement tool, e.g. until the adhesive has cured.

After releasing the blade component, the first placement tool and/or second placement tool may change from the second configuration to the first configuration. The process may be repeated with a second blade shell part and/or a second blade component.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION

In the following figure description, the same reference numbers refer to the same elements and may thus not be described in relation to all figures.

Figure 1:
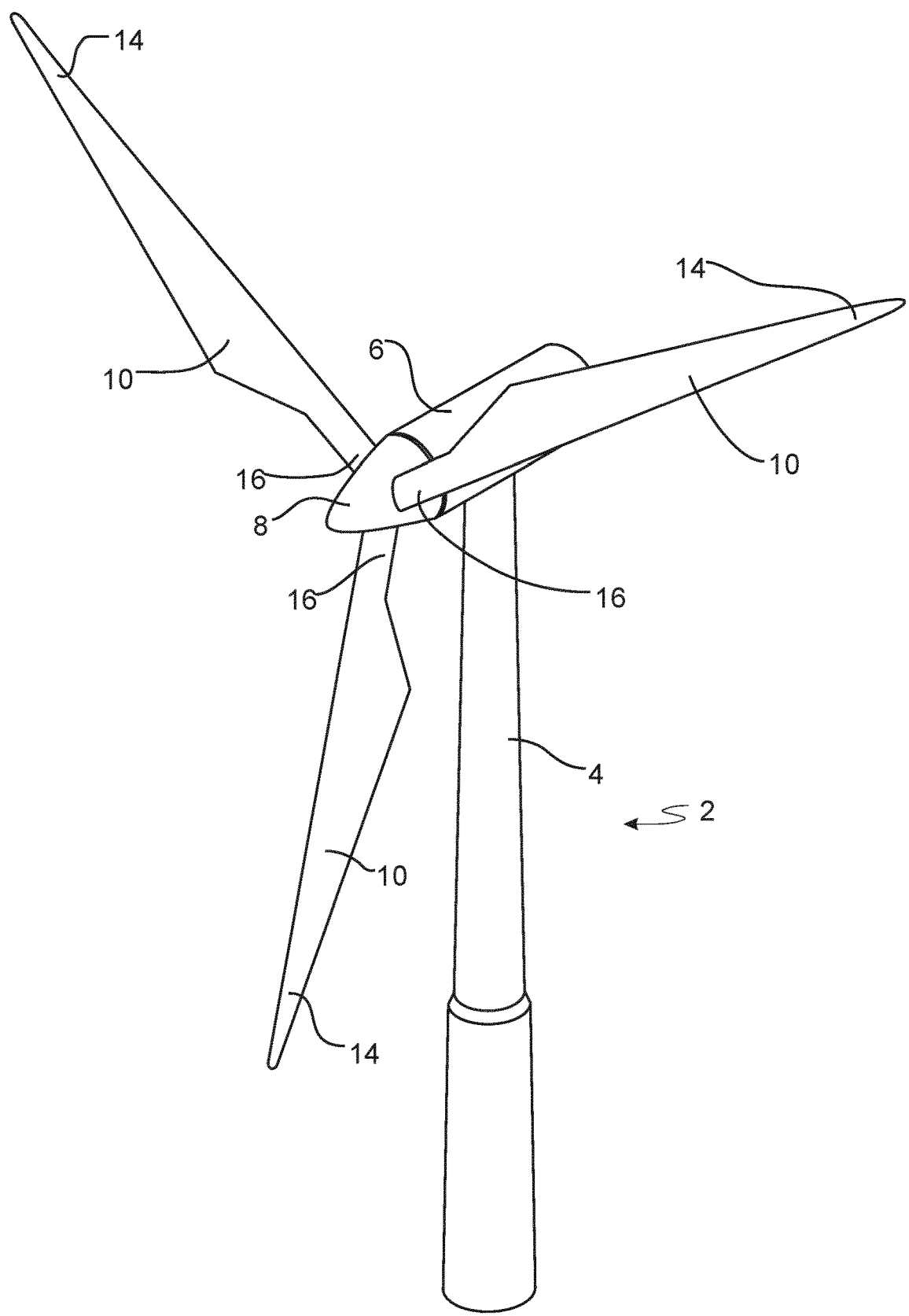
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
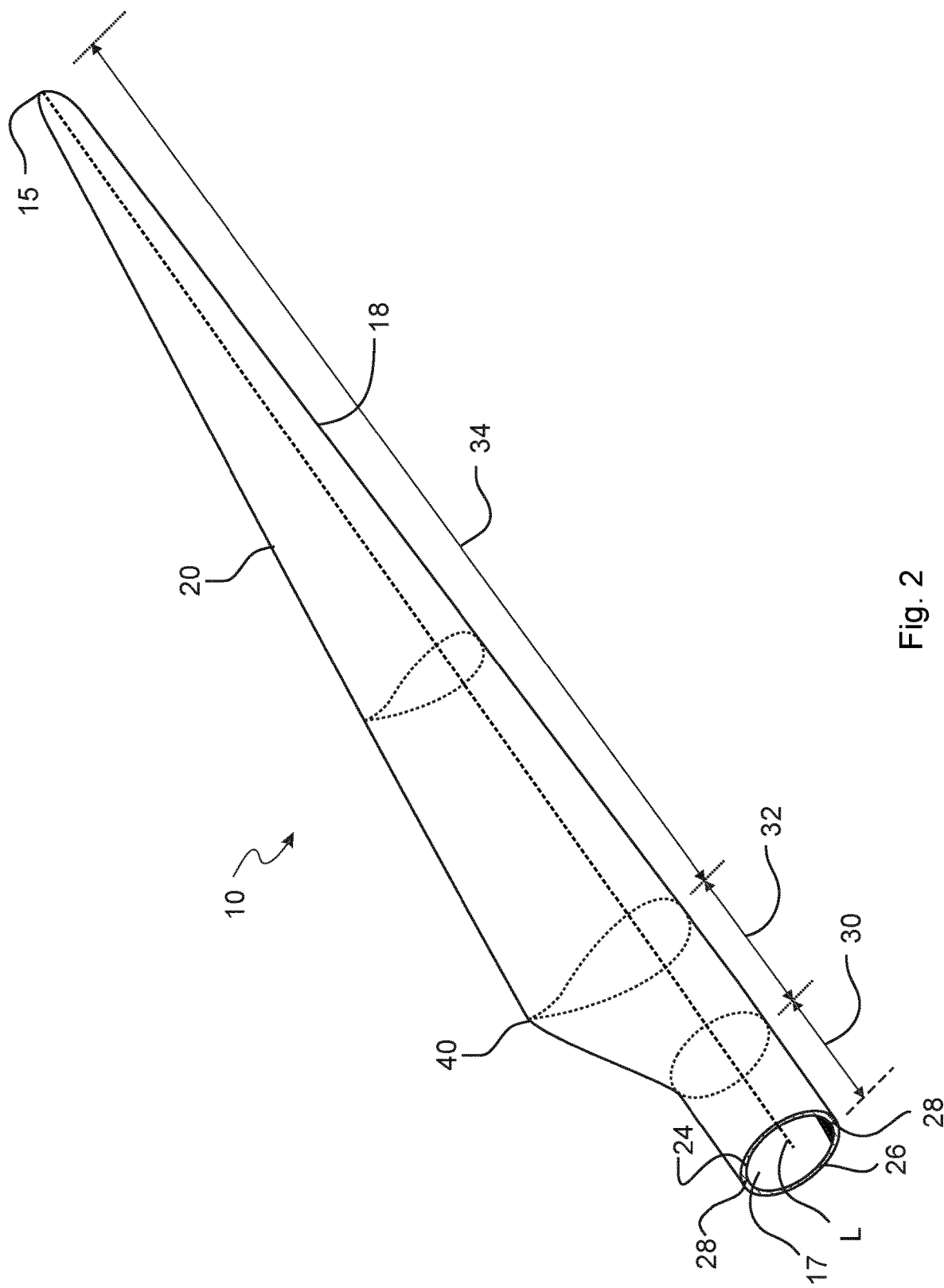
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

Figure 3:
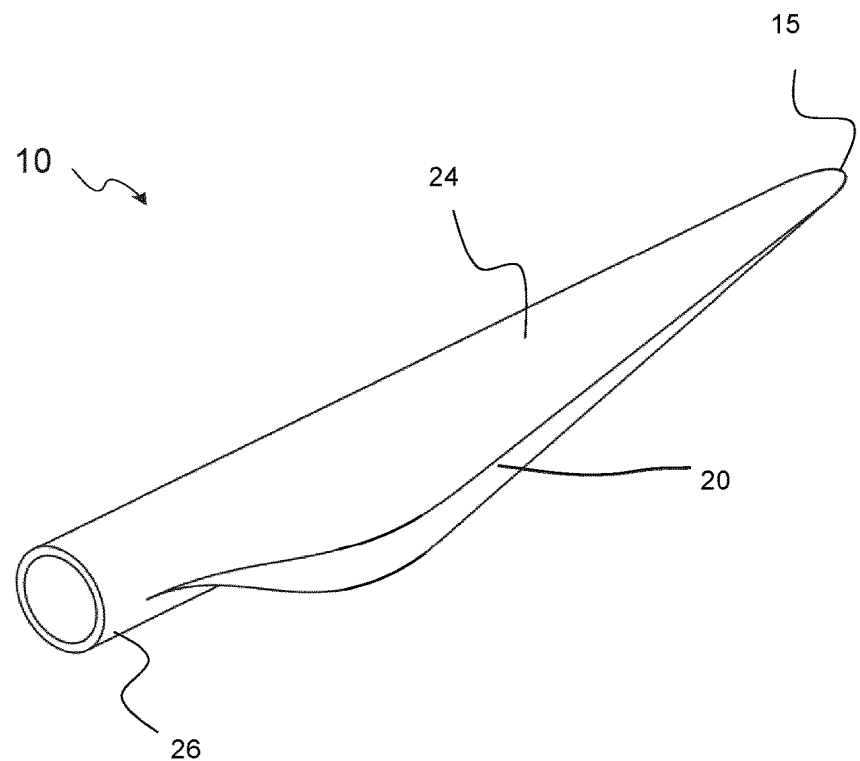
FIG. 3 is a schematic diagram illustrating an exemplary wind turbine blade.

FIG. 3 shows a wind turbine blade 10 with a flatback profile at the trailing edge 20. The trailing edge 20 has a flattened profile. The flattened profile may increase the aerodynamic efficiency and also may reduce the chord width, thereby making it easier to transport the wind turbine blade 10. Furthermore, it also may reduce required manufacturing space.

Figure 4:
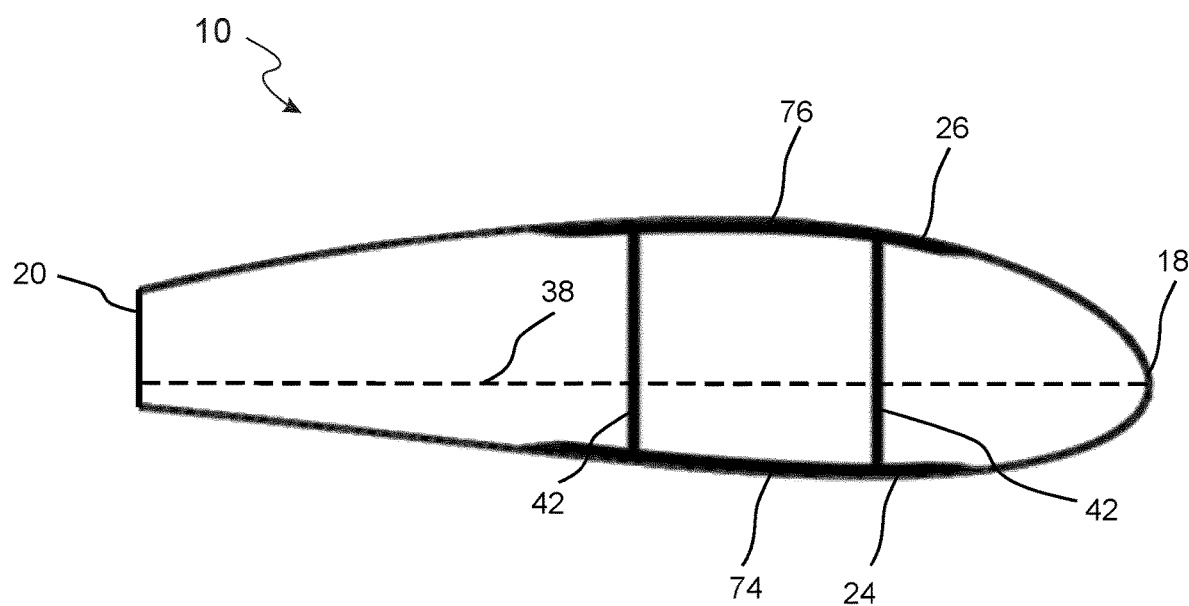
FIG. 4 is a schematic diagram illustrating a cross section of an exemplary wind turbine blade.

FIG. 4 is a schematic diagram illustrating a cross sectional view of an exemplary wind turbine blade 10, e.g. a cross sectional view of the airfoil region of the wind turbine blade 10 as described in relation to FIG. 3. The wind turbine blade 10 comprises a leading edge 18, a trailing edge 20, a pressure side 24, a suction side 26 a first spar cap 74, and a second spar cap 76. The trailing edge 20 has a flattened profile for forming a flatback profile. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The spar caps 74, 76 may comprise carbon fibres, e.g. in combination with glass fibres, while the rest of the shell parts 24, 26 may comprise glass fibres.

The wind turbine blade 10, such as the shell parts 24, 26 may comprise sandwich panels, e.g. comprising lightweight materials such as balsa or foam sandwiched between fibre-reinforced layers. The trailing edge 20 forming the flattened profile may be provided as a third shell part, or as an integral part of the first shell part 24 or the second shell part 26. Alternatively, the trailing edge 20 may be provided by parts of both the first shell part 24 and the second shell part 26.

A glue joint for assembling the first shell part 24 and the second shell part 26 may be provided near the trailing edge 20, such as between a first trailing edge part of the trailing edge 20 and a second trailing edge part of the trailing edge 20. Alternatively, the glue flange may be provided between the trailing edge 20 and the first shell part 24 or between the trailing edge 20 and the second shell part 26.

Figure 5:
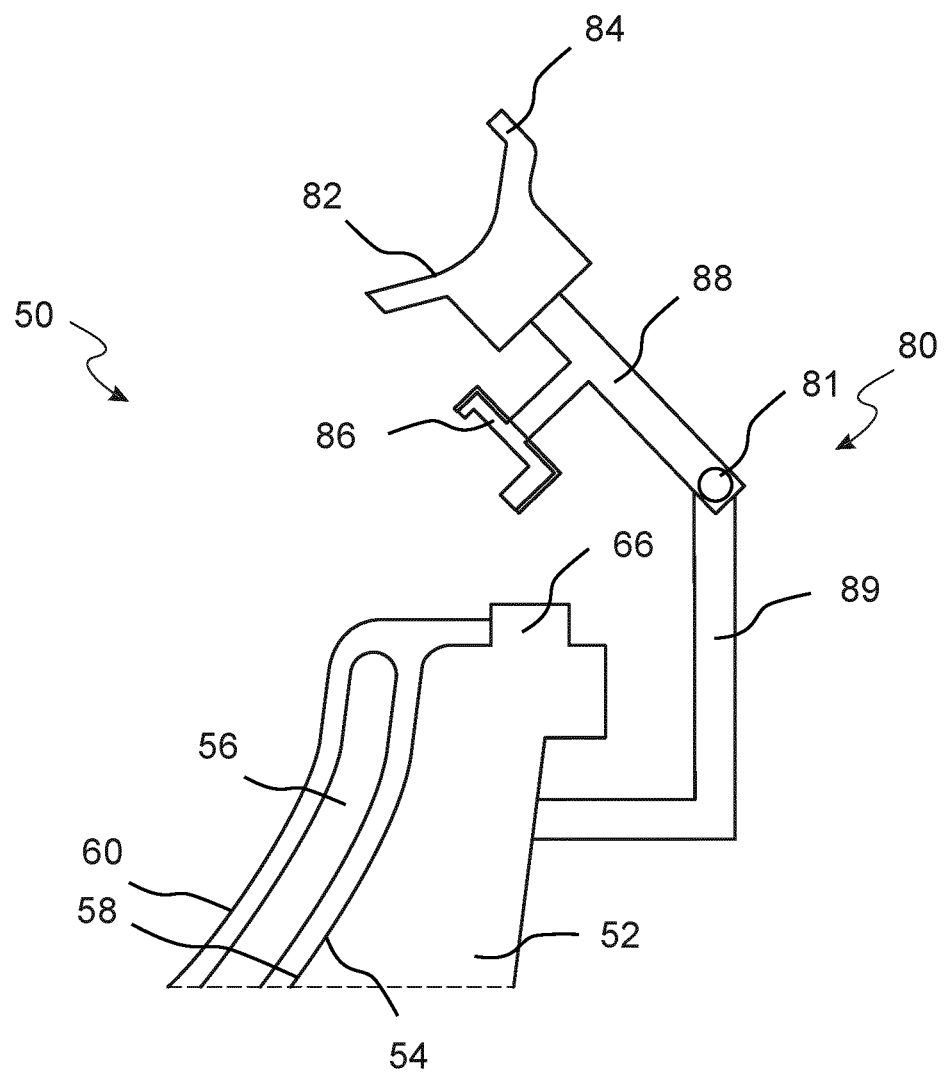
FIG. 5 is a schematic diagram illustrating a blade mould system.

FIG. 5 is a schematic diagram illustrating a blade mould system 50 for manufacturing of a wind turbine blade shell, e.g. a blade shell of the wind turbine blade 10 of the previous figures. The blade mould system 50 comprises a blade mould 52 with a moulding surface 54 for defining and outer shape of a blade shell part 56. The blade shell part 56 may be the first blade shell part 24, e.g. pressure side, or the second blade shell part 26, e.g. suction side, as illustrated in the previous figures. The blade shell part 56 comprises an outer surface 58 facing the moulding surface 54 and an inner surface 60 facing away from the moulding surface 54. For illustrative purposes, only part of the blade mould 52 and blade shell part 56 are shown.

The blade mould system 50 comprises a first placement tool 80. The first placement tool 80 is positioned at a first placement tool position relative to the blade mould 52 and is fixed to an outer part of the blade mould 52. The first placement tool 80 comprises a first movable part 88 and a first stationary part 89. The first placement tool 80 comprises a first joint 81, such as a hinge joint, between the first movable part 88 and the first stationary part 89. The first joint 81 allows rotation of the first movable part 88 relative to the first stationary part 89 around a rotation axis of the first joint 81. The rotation axis may be parallel to a longitudinal direction of the blade mould 52. The first placement tool 80 is adaptable between a first configuration (see FIG. 7) and a second configuration (see FIG. 9). The first placement tool 80 in FIG. 5 is in a third configuration between the first configuration and the second configuration.

FIGS. 6-11 are schematic diagrams illustrating exemplary instances of an exemplary method of assembling a wind turbine blade with a blade mould system 50. For illustrative purposes, only part of the blade mould 52 and blade shell part 56 are shown.

Figure 6:
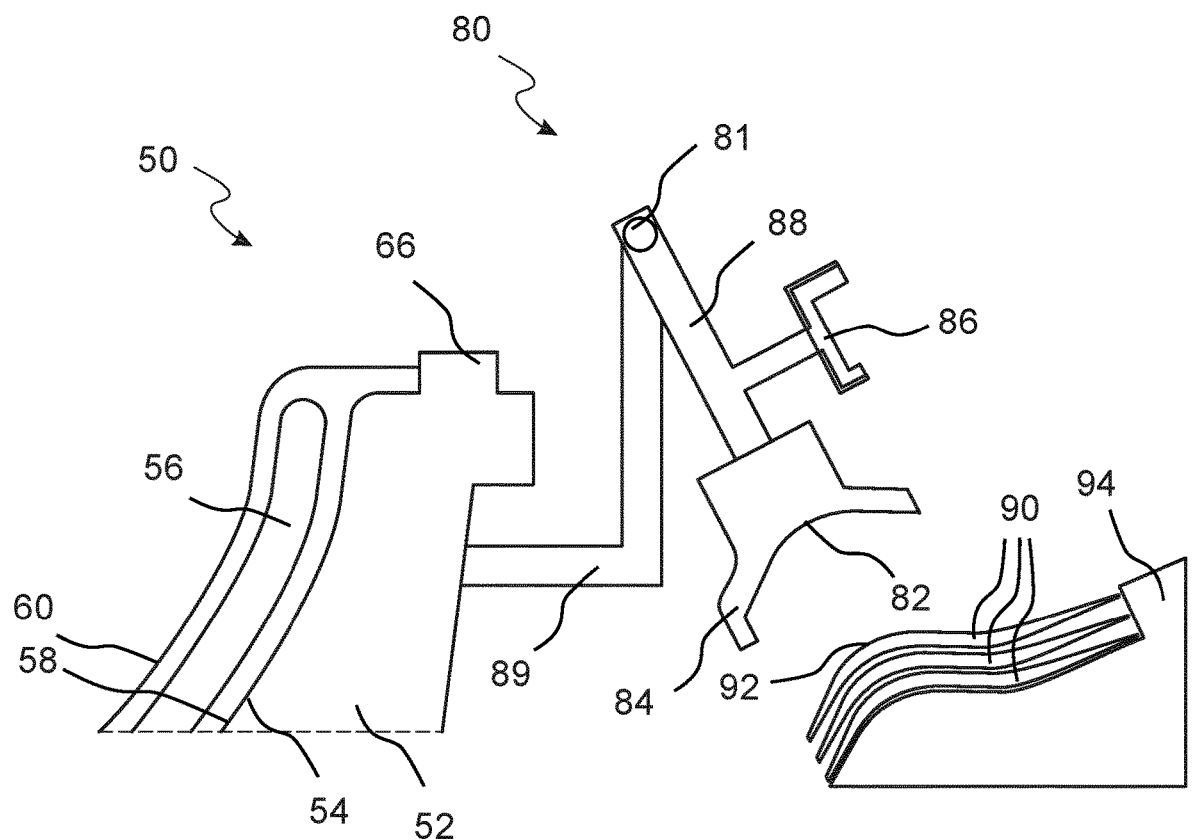
FIGS. 6-11 are schematic diagrams illustrating exemplary instances of an exemplary method of assembling a wind turbine blade.
Figure 7:
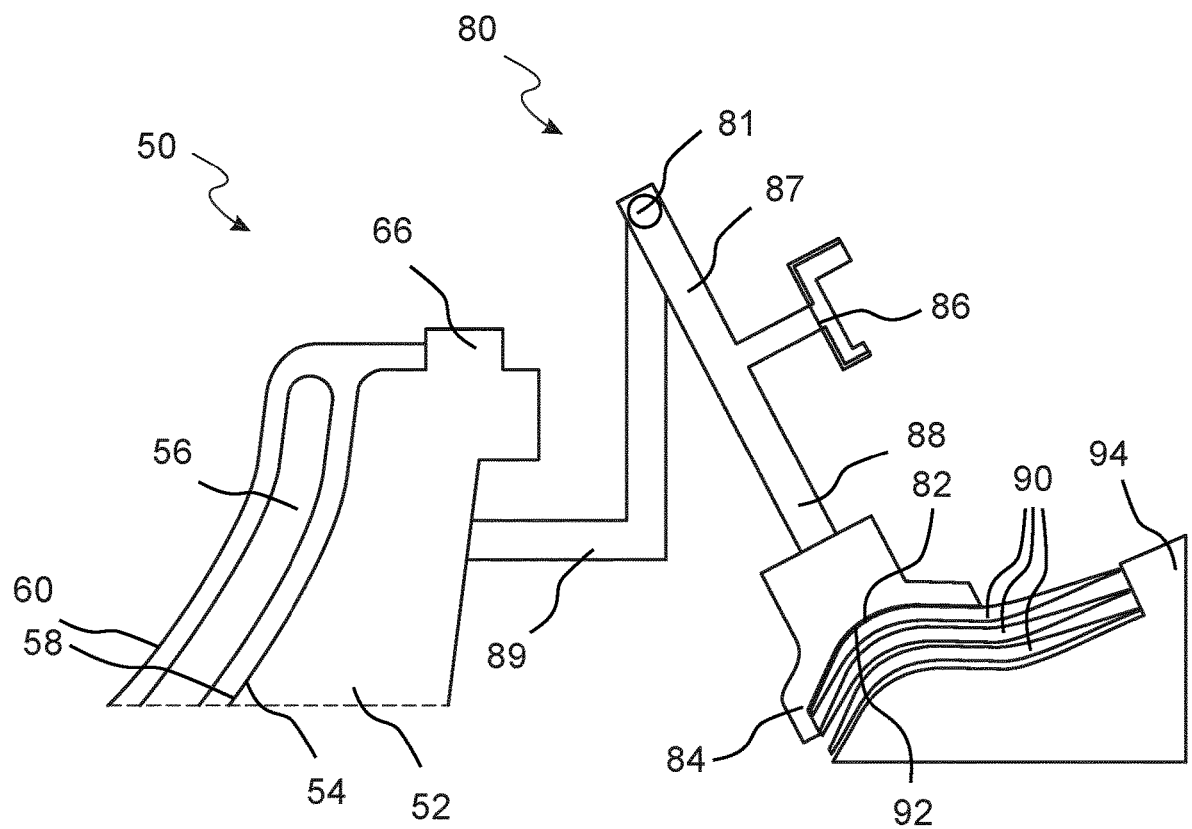

The first placement tool 80 comprises a first engaging surface 82 configured to engage with a blade component 90, such as with a primary side surface part 92 of the blade component 90, e.g. when the blade component 90 is in a primary component position, such as in FIGS. 6 and 7. The first placement tool 80 comprises a first alignment tab 84 configured to align the primary side surface part 92 in a predefined position on the first engaging surface 82.

The blade component 90 is held in a component holder 94, as shown in FIGS. 6 and 7, configured to retain one or more blade components 90 in the primary component position. The component holder 94 is positioned at a component holder position relative to the blade mould 52.

FIG. 7 shows the first placement tool 80 engaging with the blade component 90 in the first configuration. In order for the first placement tool 80 to reach the blade component 90 the first movable part 88 may comprise a first extending part 87 configured to extend and retract the first movable part 88. The first engaging surface 82 of the first movable part 88 contacts and releasably attaches to the primary side surface part 92 of blade component 90, e.g. by creating a negative pressure between the two surfaces 92, 82 to create an attraction such as vacuum. Alternatively, the two surfaces may be attracted by magnetism or mechanical means. The first alignment tab 84 aligns the primary side surface part 92 of the blade component 90 in a predetermined position on the first engaging surface 82.

Figure 8:
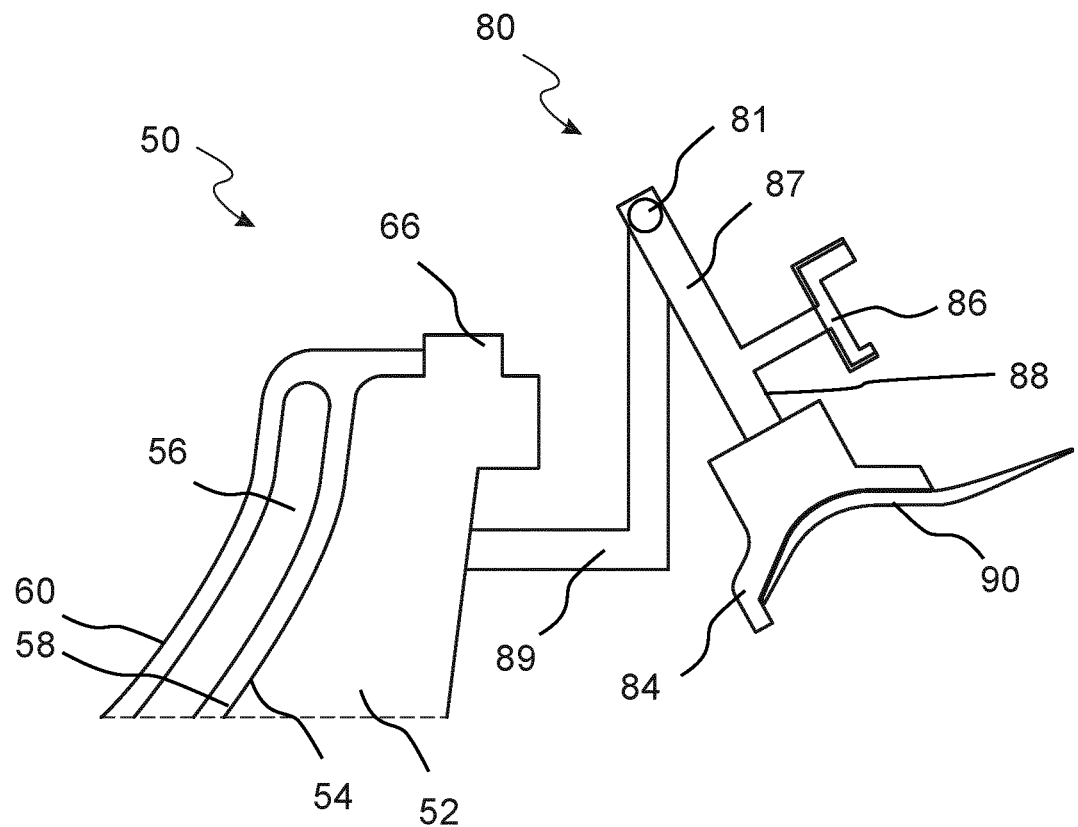

FIG. 8 shows the first extending part 87 of the first movable part 88 being retracted. The blade component 90 is attached to the first placement tool 80.

Figure 9:
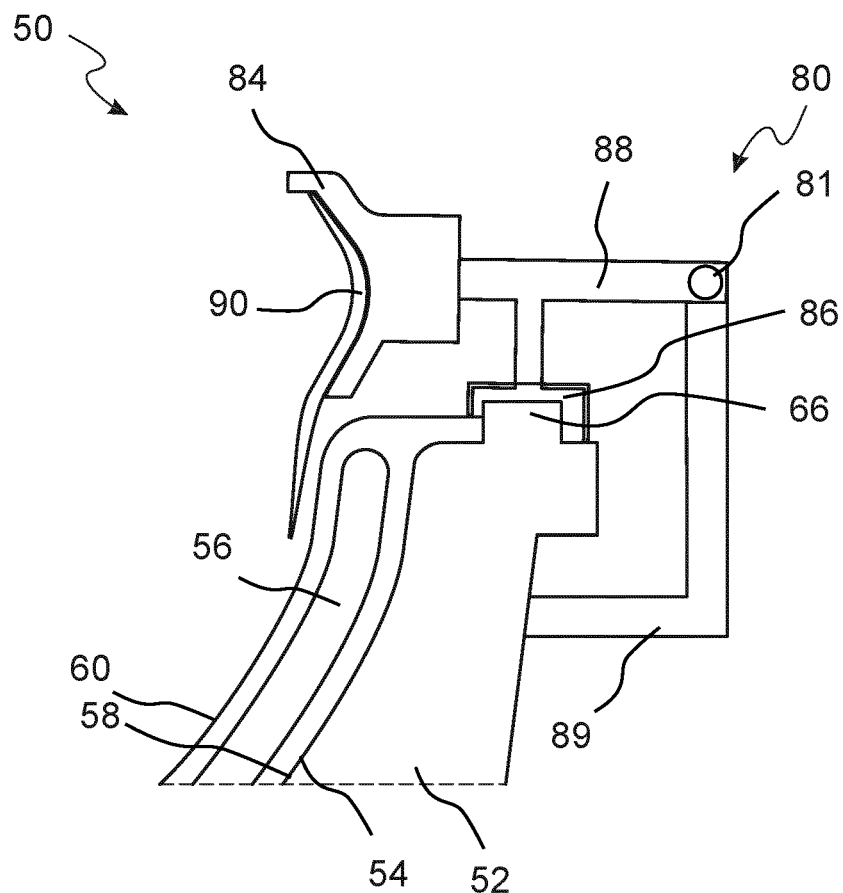

FIG. 9 shows the first placement tool 80 in the second configuration, where the first movable part 88 is in the second position relative to the first stationary part 89. The first movable part 88 has been rotated about the rotation axis of the first joint 81.

In the second configuration a first guiding part 86 of the first movable part 88 engages with a mould guiding part 66 on the blade mould 52. When the first guiding part 86 and the mould guiding part 66 are engaged, the guiding tool 80 is guided into a predefined second configuration and thereby the blade component 90 is guided into a predefined secondary component position. The two guiding parts 86, 66 secures the first placement tool 80 against movement relative to the blade mould 52, and provides an enhanced precision of the position of the blade component 90 when the first positioning tool 80 is in the second configuration. The first guiding part 86 may have a female configuration and the mould guiding part 66 may have a male configuration, or opposite.

Figure 10:
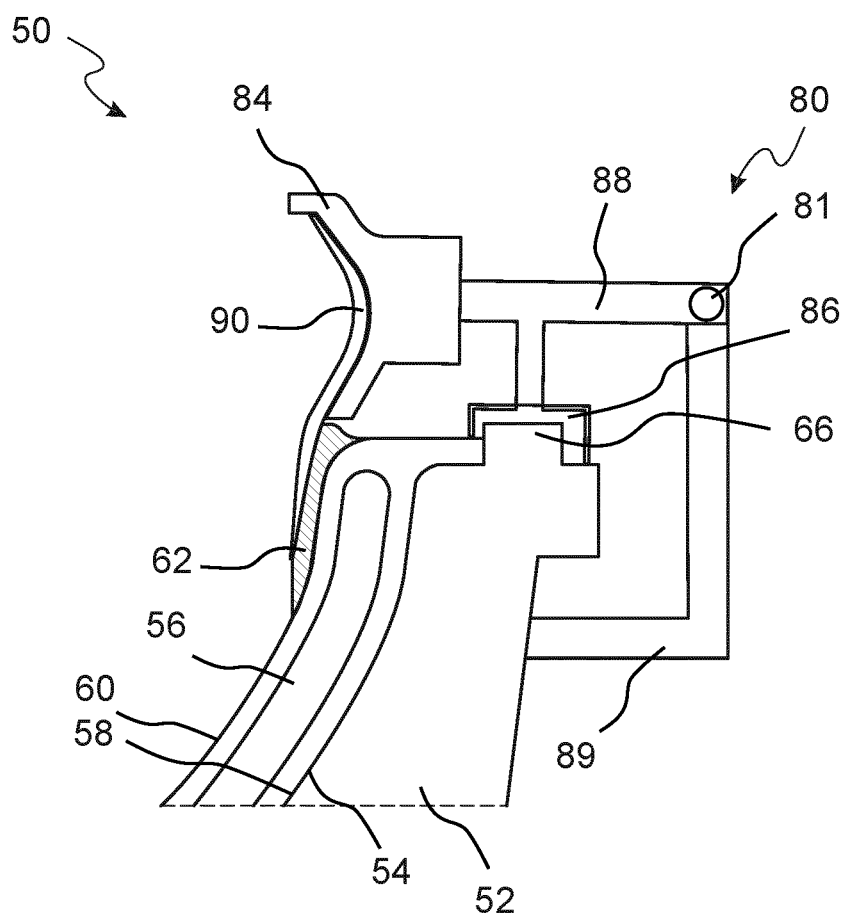

The blade shell part 56 comprises an attachment area 62 on the inner surface 60, as illustrated in FIG. 10. The attachment area 62 may be provided with an adhesive, such as a fast curing adhesive. In the second configuration of the first placement tool 80, the blade component 90 contacts the attachment area 62 with the adhesive. The adhesive may cure and the blade component 90 is attached to the blade shell part 56 in the secondary component position.

Figure 11:
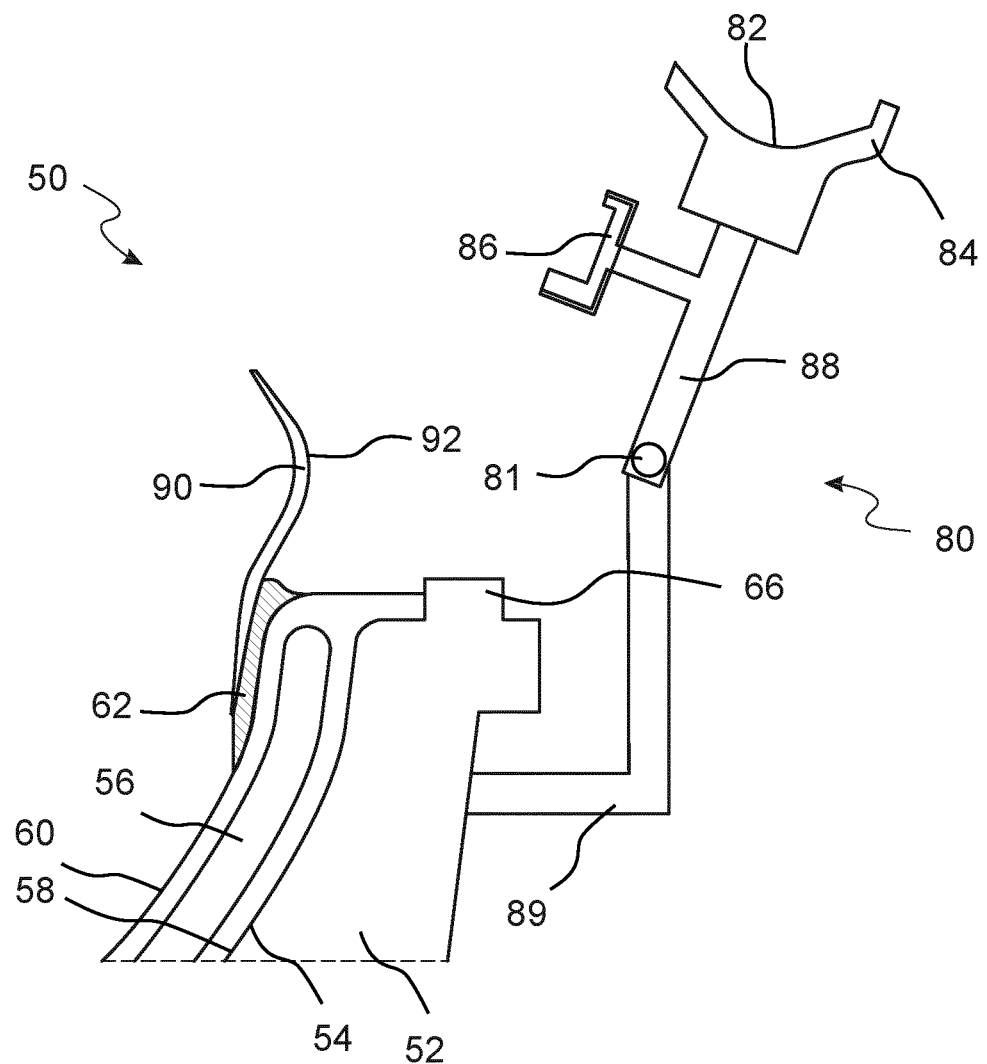

The first placement tool 80 may release the blade component 90 once the adhesive is cured, as seen in FIG. 11. Releasing the blade component 90 may comprise deactivating attracting means, such as deactivating the negative pressure causing the vacuum. The first placement tool 80 may then be moved from the second configuration towards the first configuration, such as to a third configuration, and the process may be repeated with a second blade shell part and a second blade component.

Figure 12:
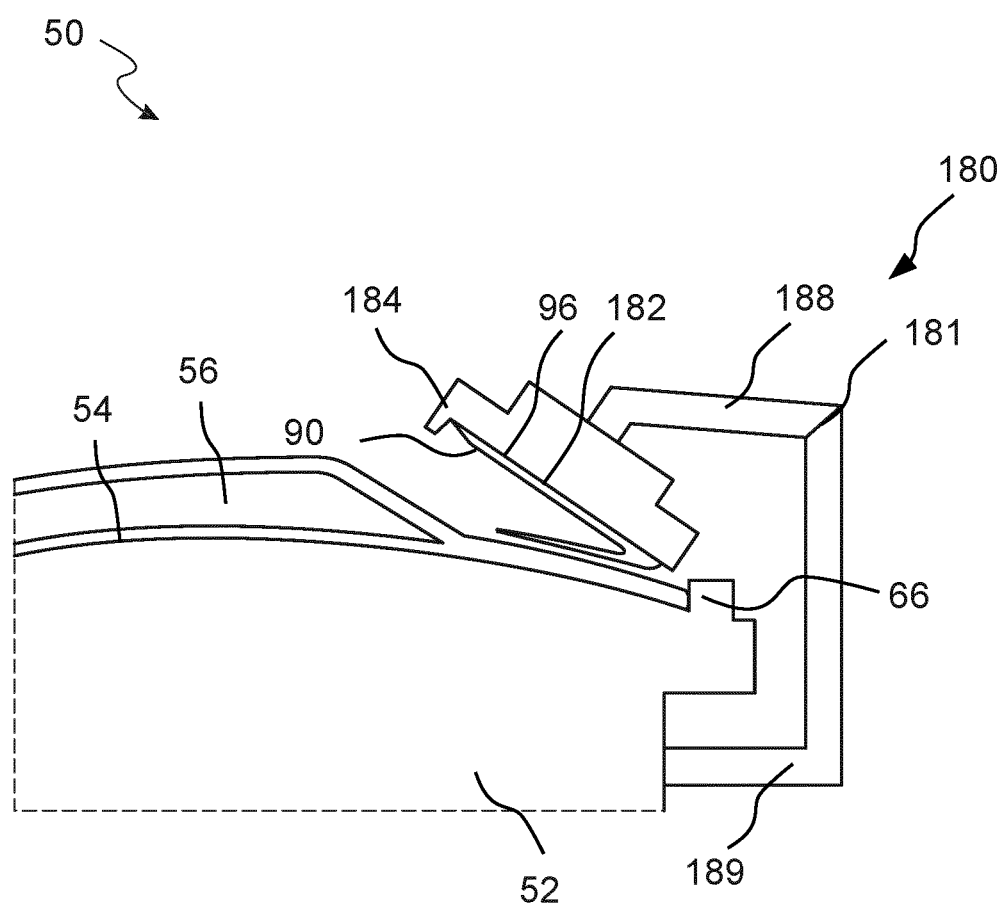
FIG. 12 is a schematic diagram illustrating a blade mould system.

The blade mould system 50 may comprise a plurality of placement tools. FIG. 12 is a schematic diagram illustrating a second placement tool 180, e.g. of the blade mould system 50. The second placement tool 180 may be located closer to the root and the first placement tool may be located closer to the tip. Alternatively, the second placement tool 180 may be located closer to the tip and the first placement tool may be located closer to the root.

The second placement tool 180 is positioned at a second placement tool position relative to the blade mould 52 and is fixed to an outer part of the blade mould 52. The second placement tool 180 comprises a second movable part 188 and a second stationary part 189. The second placement tool 180 is adaptable between a first configuration and a second configuration, as seen in FIG. 12.

The second placement tool 180 comprises a second engaging surface 82 configured to engage with the blade component 90, such as with a secondary side surface part 96 of the blade component 90, e.g. when the blade component 90 is in a primary component position. The second placement tool 180 comprises a second alignment tab 184 configured to align a secondary side surface part 96 in a predefined position on the second engaging surface 182. The secondary side surface part 96 may have a different shape than the primary side surface part 92. The second engaging surface 182 on the second placement tool 180 may have a different shape than the first engaging surface 82 of the first placement tool 80.

The second placement tool 180 comprises a second joint 181, such as a hinge joint, between the second movable part 188 and the second stationary part 189. The second movable part 188 is configured to rotate about a rotation axis of the second joint 181.

Although not specifically illustrated, the second placement tool 180 may comprise a second guiding part, such as the first guiding part of the first placement tool, as illustrated in the previous figures.

Figure 13:
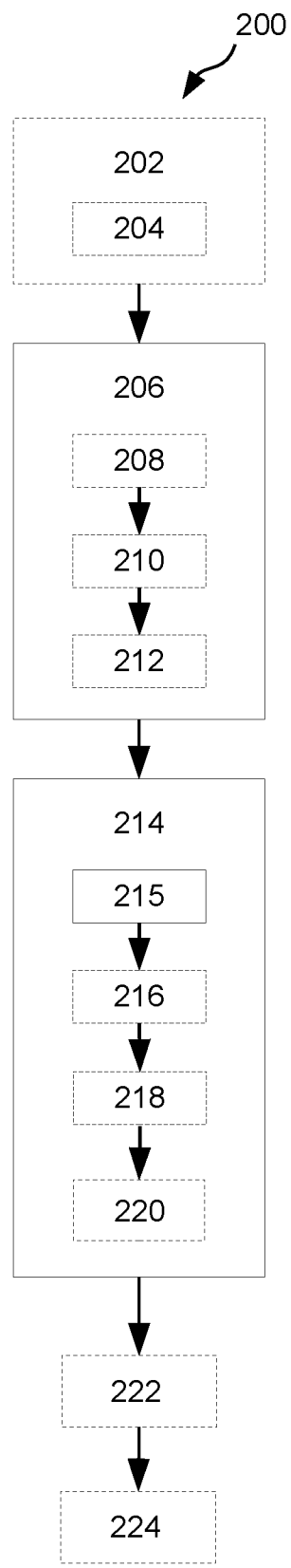
FIG. 13 is a block diagram of an exemplary method.

FIG. 13 is a block diagram of an exemplary method 200 for assembling a wind turbine blade with a blade mould system, such as the blade mould system as described with respect to the previous figures.

The method 200 comprises a first placement tool attaining 202 a first configuration. The first placement tool attaining 202 the first configuration may comprise rotating 204 a first movable part into a first position. Rotation of the first movable part may be relative to a first stationary part of the first placement tool around a rotation axis. Alternatively, e.g. if the first placement tool already attains the first configuration, attaining 202 may be skipped.

The method 200 comprises engaging 206 the first placement tool with a blade component in a primary component position. Engaging 206 the placement tool with a blade component may comprise contacting and releasably attaching 208 a first engaging surface of the placement tool to a primary side surface part of the blade component. Engaging 206 the placement tool with the blade component may comprise aligning 210 the primary side surface part in a predefined position on the first engaging surface. Engaging 206 the placement tool with a blade component may comprise applying 212 a negative pressure between the first engaging surface and the primary side surface part, i.e. applying vacuum.

The method 200 comprises positioning 214 the blade component at a secondary component position relative to the moulding surface by the first placement tool attaining 215 a second configuration. Positioning 214 may comprise rotating 216 the first movable part of the first placement tool to a second position relative to the first stationary part, different from the first position. Positioning 214 may comprise engaging 218 a first guiding part of the first placement tool with the mould guiding part. Positioning 214 may comprise placing 220 the blade component over an attachment area of an inner surface of the blade shell part.

The method 200 may comprise waiting 222 until the blade component has been fixed to the attachment area, e.g. by an adhesive, before releasing 224 the blade component from the first placement tool.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
40 shoulder
42 shear web or spar side
50 blade mould system
52 blade mould
54 moulding surface
56 blade shell part
58 outer surface
60 inner surface
62 attachment area
66 mould guiding part
74 first spar cap
76 second spar cap
80 first placement tool
81 first joint
82 first engaging surface
84 first alignment tab
86 first guiding part
87 first extending part
17
88 first movable part
89 first stationary part
90 blade component
92 primary side surface part
94 component holder
96 secondary side surface part
180 second placement tool
181 second joint
182 second engaging surface
184 second alignment tab
188 second movable part
189 second stationary part
200 method
202 attaining
204 rotating
206 engaging
208 contacting and attaching 210 aligning
212 applying negative pressure
214 positioning
215 attaining
216 rotating
218 engaging
220 placing
222 waiting
224 releasing

The invention claimed is:

1. A blade mould system for manufacturing of a wind turbine blade shell, the blade mould system comprising:
- a blade mould having a moulding surface for defining an outer shape of a blade shell part, the blade shell part having an outer surface facing the moulding surface and an inner surface facing away from the moulding surface; and
- a first placement tool being positioned at a first placement tool position relative to the blade mould, the placement tool being adaptable between a first configuration and a second configuration,
- the first placement tool being configured to:
  - engage with a blade component being in a primary component position, the blade component being a glue flange for joining two half shells of a flat back wind turbine blade; and
  - position the blade component at a secondary component position relative to the moulding surface by the first placement tool attaining the second configuration, wherein the blade component is configured to be attached to the blade shell part in the secondary component position,
- wherein the first placement tool comprises a first movable part and a first stationary part, and wherein the first movable part is rotatable relative to the first stationary part around a rotation axis,
- wherein the first placement tool further comprises a first guiding part,
- wherein the blade mould comprises a mould guiding part, and
- wherein the first guiding part is configured to engage with the mould guiding part when the first placement tool is in the second configuration.

2. The blade mould system according to claim 1, wherein the blade component in the secondary component position is configured to contact an attachment area of the inner surface of the blade shell part, the attachment area comprising adhesive.

3. The blade mould system according to claim 1, wherein the first placement tool is fixed to an outer part of the blade mould.

4. The blade mould system according to claim 1, wherein the first placement tool comprises a first engaging surface configured to contact and releasably attach to a primary side surface part of the blade component.

5. The blade mould system according to claim 4, wherein the first engaging surface comprises a first alignment tab configured to align the primary side surface part in a predefined position on the first engaging surface.

6. The blade mould system according to claim 1, comprising a component holder configured to retain the blade component in the primary component position, wherein the first placement tool is configured to engage with the blade component in the primary component position by attaining the first configuration, wherein the first placement tool is able to retrieve the blade component from the component holder.

7. The blade mould system according to claim 1, wherein the first placement tool comprises a first engaging surface configured to contact and releasably attach to a primary side surface part of the blade component, wherein the first movable part comprises the first engaging surface and the first guiding part.

8. The blade mould system according to claim 7, wherein the first movable part is in a first position relative to the first stationary part when the first placement tool is in the first configuration, and wherein the first movable part is in a second position relative to the first stationary part, different from the first position, when the first placement tool is in the second configuration.

9. The blade mould system according to claim 7, wherein the first placement tool comprises a first extending part configured to extend and retract the first movable part relative to the first stationary part along an extension axis.

10. The blade mould system according to claim 7, wherein the first placement tool comprises a hinge joint between the first movable part and the first stationary part, and wherein the first movable part is rotatable around a rotation axis.

11. The blade mould system according to claim 1, comprising a plurality of placement tools including the first placement tool and a second placement tool, the plurality of placement tools being distributed along the longitudinal direction of the blade mould.

12. A method for assembling a wind turbine blade with a blade mould system comprising a blade mould and a first placement tool, the blade mould having a moulding surface for defining an outer shape of a blade shell part, the blade shell part having an outer surface facing the moulding surface and an inner surface facing away from the moulding surface, the first placement tool comprising a first movable part and a first stationary part, wherein the first movable part is rotatable relative to the first stationary part around a rotation axis, the first placement tool being positioned at a first placement tool position relative to the blade mould, the placement tool being adaptable between a first configuration and a second configuration, wherein the first placement tool further comprises a first guiding part, wherein the blade mould comprises a mould guiding part, and wherein the first guiding part is configured to engage with the mould guiding part when the first placement tool is in the second configuration, the method comprising:
- engaging the first placement tool with a blade component being in a primary component position; and
- positioning the blade component at a secondary component position relative to the moulding surface by the first placement tool attaining the second configuration, wherein the blade component is configured to be attached to the blade shell part in the secondary component position.

13. The method according to claim 12, comprising the first placement tool attaining the first configuration prior to engaging the first placement tool with the blade component.

14. The method according to claim 12, wherein engaging the first placement tool with the blade component comprises contacting and releasably attaching a first engaging surface of the first placement tool to a primary side surface part of the blade component.

15. The method according to claim 14, wherein engaging the first placement tool with the blade component comprises applying a negative pressure between the first engaging surface and the primary side surface part.

16. The method according to claim 12, wherein engaging the first placement tool with the blade component comprises aligning the primary side surface part in a predefined position on the first engaging surface.

17. The method according to claim 12, wherein positioning the blade component in the secondary component position comprises placing the blade component over an attachment area of an inner surface of the blade shell part.

18. The method according to claim 12, wherein positioning the first placement tool in the first and/or second configuration comprises rotating the first movable part relative to the first stationary part around a rotation axis.

\* \* \* \* \*